United States Patent

Nanba

[19]

[11] Patent Number: 5,819,081
[45] Date of Patent: Oct. 6, 1998

[54] METHOD OF EXECUTING A BRANCH INSTRUCTION OF JUMPING TO A SUBROUTINE IN A PIPELINE CONTROL SYSTEM

[75] Inventor: Shinji Nanba, Kanagawa, Japan

[73] Assignee: Sony Corporation, Tokyo, Japan

[21] Appl. No.: 862,842

[22] Filed: May 23, 1997

Related U.S. Application Data

[63] Continuation of Ser. No. 335,663, Nov. 8, 1994, abandoned, which is a continuation of Ser. No. 133,298, Oct. 8, 1993, abandoned.

[30] Foreign Application Priority Data

Oct. 13, 1992 [JP] Japan .................................. 4-301692

[51] Int. Cl.$^6$ ............................................................ G06F 9/42
[52] U.S. Cl. ........................................................... 395/590
[58] Field of Search ...................................... 395/591, 590, 395/589, 580

[56] References Cited

U.S. PATENT DOCUMENTS

| | | | |
|---|---|---|---|
| 3,789,365 | 1/1974 | Jen et al. ................................. | 395/737 |
| 3,967,104 | 6/1976 | Brantingham ....................... | 364/709.09 |
| 4,003,033 | 1/1977 | O'Keefe et al. ........................ | 395/287 |
| 4,179,737 | 12/1979 | Kim ......................................... | 395/375 |
| 4,394,729 | 7/1983 | Armstrong .............................. | 395/775 |
| 4,399,507 | 8/1983 | Cosgrove et al. ...................... | 395/375 |
| 4,488,227 | 12/1984 | Miu et al. ............................... | 395/375 |
| 4,821,183 | 4/1989 | Hauris .................................... | 395/375 |
| 4,910,664 | 3/1990 | Arizono .................................. | 395/375 |
| 4,969,091 | 11/1990 | Muller .................................... | 395/775 |
| 5,127,091 | 6/1992 | Boufarah et al. ...................... | 395/375 |
| 5,193,205 | 3/1993 | Matsuo et al. .......................... | 395/800 |
| 5,202,967 | 4/1993 | Matsuzaki et al. ..................... | 395/375 |
| 5,301,289 | 4/1994 | Suzuki et al. ........................... | 395/400 |
| 5,317,700 | 5/1994 | Hammitt et al. ....................... | 395/375 |
| 5,317,702 | 5/1994 | Morisada ................................ | 395/375 |

*Primary Examiner*—David Y. Eng
*Attorney, Agent, or Firm*—Frommer Lawrence & Haug LLP; William S. Frommer

[57] ABSTRACT

A method of executing a branch instruction of jumping to a subroutine in a pipeline control system. The pipeline control system, which utilizes a data bus for instruction read operation and also for data read/write operation, performs at least one stage between an instruction fetching stage and an instruction executing stage. A branch instruction is fetched with a branch address fed through an address bus. The content of a first program counter is temporarily saved in a second program counter. The content of the first program counter is then updated with a new branch address. Following this, the content of the second program counter is saved in a computer memory for use as a return address.

8 Claims, 3 Drawing Sheets

5,819,081

METHOD OF EXECUTING A BRANCH INSTRUCTION OF JUMPING TO A SUBROUTINE IN A PIPELINE CONTROL SYSTEM

This application is a continuation of application Ser. No. 08/335,663, filed Nov. 8, 1994 and now abandoned, which is a continuation of Ser. No. 08/133,298, filed Oct. 8, 1993 and now abandoned.

BACKGROUND OF THE INVENTION

This invention relates to a method of executing a branch instruction of jumping to a subroutine in a pipeline control system utilizing a data bus for instruction read operation and also for data read/write operation to perform at least one stage between an instruction fetching stage and an instruction executing stage.

FIG. 1 is a schematic block diagram showing a conventional pipeline control system which includes a central processing unit (CPU) 1 which utilizes pipelines, as shown in FIG. 2, to execute a branch instruction of jumping to a subroutine. The central processing unit 1 includes an instruction register (IREG) 2, a branch address generator (ADDGEN) 6, a program counter (PC) 7 and a stack pointer 9. The central processing unit 1 communicates with a computer memory 3 through a data bus (DB) 4 and also through an address bus (AB) 5.

In FIG. 2, the character INST 2 indicates a branch instruction of jumping to a subroutine, and the character INST 3 indicates the first instruction made after the branched instruction is executed. The branch instruction includes the first, second and third steps. At the first step, the content (return address RETAD) of the program counter 7 is saved in the computer memory 3 before it is updated with a new branch address (BRAD). During this step, the return address (RETAD) stored in the program counter 7 is shifted through the path d to the data bus 4 and, in turn, through the path e to the computer memory 3. In this case, the stack address of the stack pointer 9 is fed through the path h to the address bus 5 and, in turn, through the path f to the computer memory 3. At the second step, a new branch address (BRAD) is produced in the branch address generator 6 and it is fed through the path a to the address bus 5 and, in turn, through the path b to update the content of the program counter 7. At the third step, the branched instruction is fetched with the branch address (BRAD) fed through the address bus 5. That is, the branch address (BRAD) produced in the branch address generator 6 is fed through the path a to the address bus 5 and, in turn, through the path f to the computer memory 3. The branched instruction is read from the computer memory 3 and it is fed through the path e to the data bus 4 and, in turn, through the path g to the instruction register 2.

As can be seen from the foregoing, the conventional method executes a branch instruction of jumping to a subroutine by fetching the branched instruction after the return address (RETAD) is saved in the computer memory 3. For this reason, the next instruction (INST 3) can be executed three cycle after the branched instruction if the first and second steps are made at the same time. That is, four cycles are required until the next instruction is executed after the return address (RETAD) is saved since the return address saving and instruction fetching operations employ the same bus and they cannot be performed at the same time.

SUMMARY OF THE INVENTION

It is, therefore, a main object of the invention to provide an improved branch instruction executing method which can execute a branch instruction of jumping to a subroutine at a reduced number of execution cycles and at an increased rate.

There is provided, in accordance with the invention, a method of executing a branch instruction of jumping to a subroutine in a pipeline control system. The pipeline control system utilizes a data bus for instruction read operation and also for data read/write operation and performs at least one stage between an instruction fetching stage and an instruction executing stage. The branch instruction executing method comprises the steps of fetching the branched instruction, then saving a return address to which control is returned from the subroutine, and thereafter executing the branched instruction.

BRIEF DESCRIPTION OF THE DRAWINGS

This invention will be described in greater detail by reference to the following description taken in connection with the accompanying drawings, in which.

DETAILED DESCRIPTION OF THE INVENTION

Figure 1:
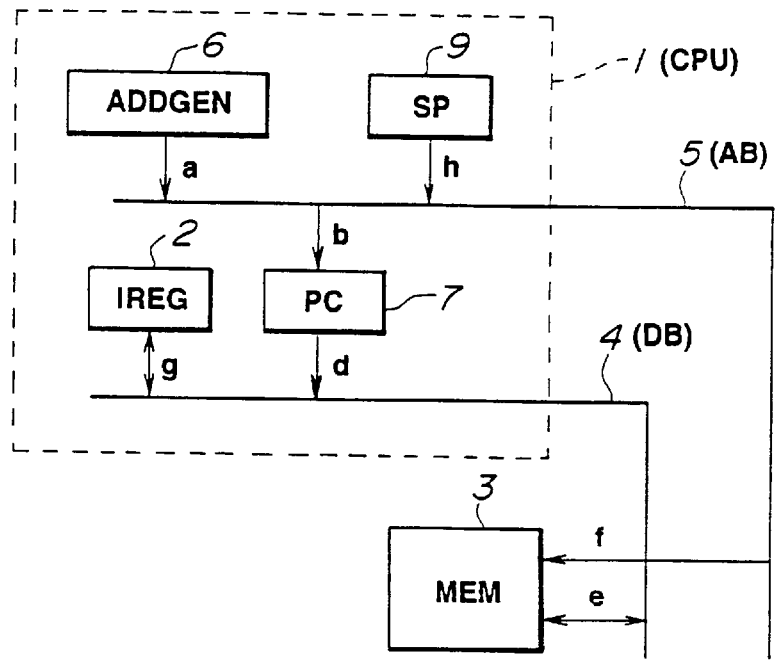
FIG. 1 is a schematic block diagram showing a conventional branch instruction executing system.
Figure 3:
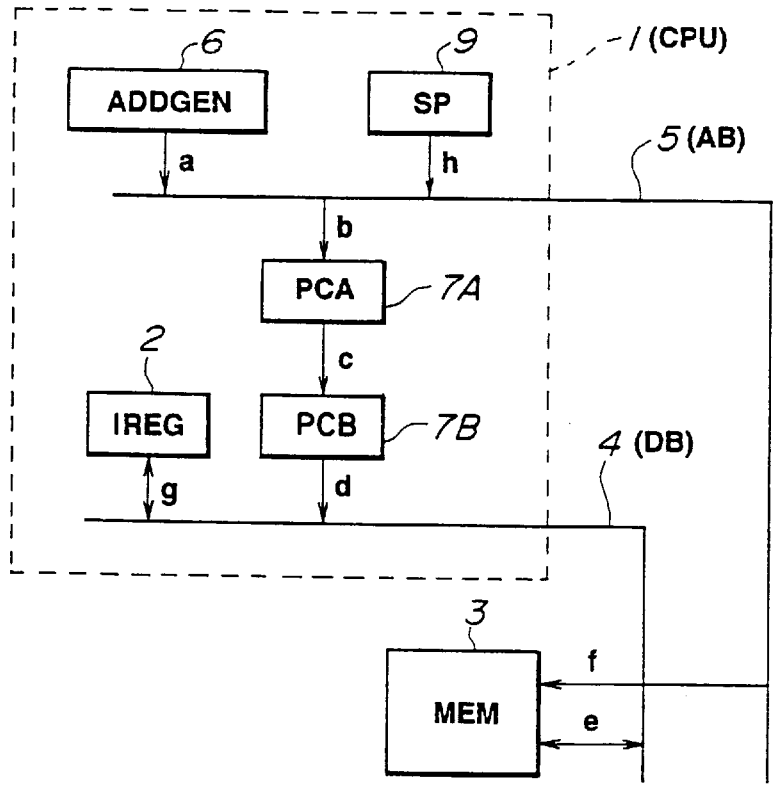
FIG. 3 is a schematic block diagram showing one embodiment of a branch instruction executing system made in accordance with the invention.
Figure 2:
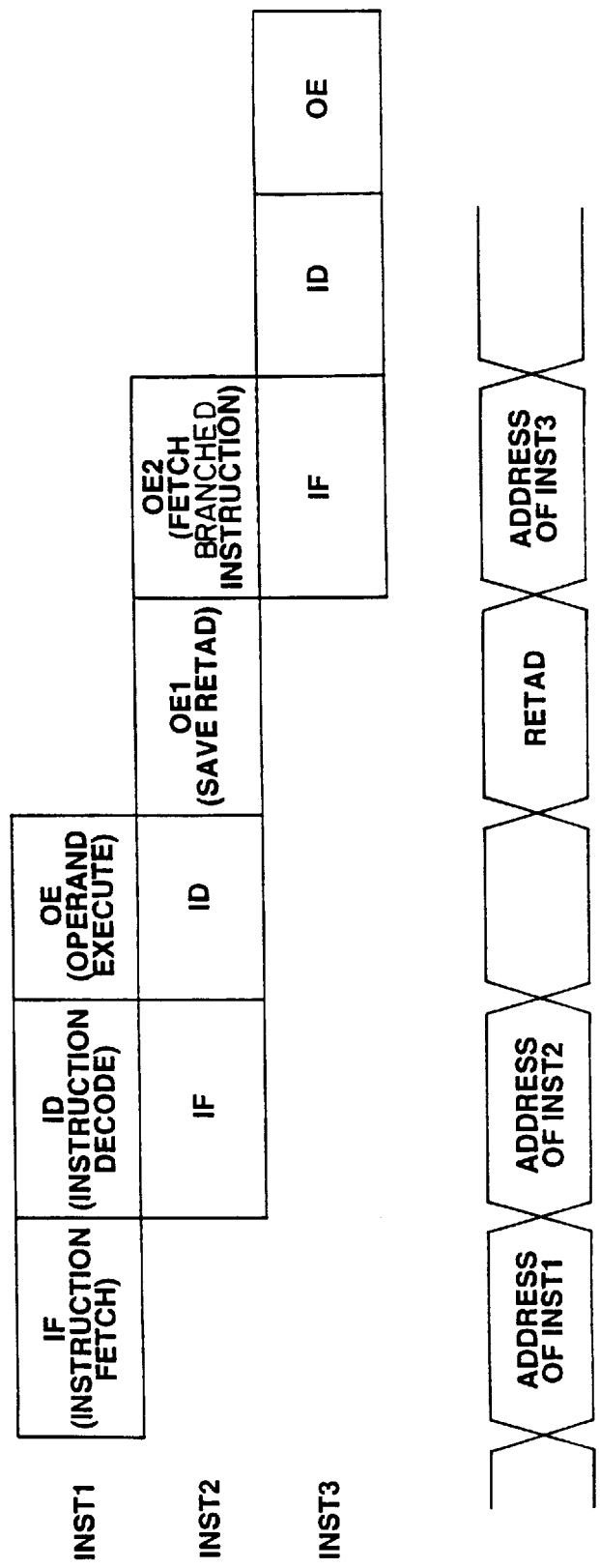
FIG. 2 is a diagram showing an instruction executing sequence of the conventional branch instruction executing system.

With reference to FIG. 3, there is shown a branch instruction executing system embodying the invention. The branch instruction executing system includes a central processing unit (CPU) 1 having an instruction register (IREG) 2, a branch address generator (ADDGEN) 6, a program counter (PCA) 7A, a register (PCB) 7B, a stack pointer (SP) 9. The central processing unit 1 communicates with a computer memory 3 through a data bus (DB) 4 and also through an address bus (AB) 5. The central processing unit 1 utilizes the data bus 4 not only for data read/write operation but also for instruction read operation. The central processing unit 1 is arranged to perform a pipeline control at a plurality of stages including at least one stage between an instruction fetching stage and an instruction executing stage.

Figure 4:
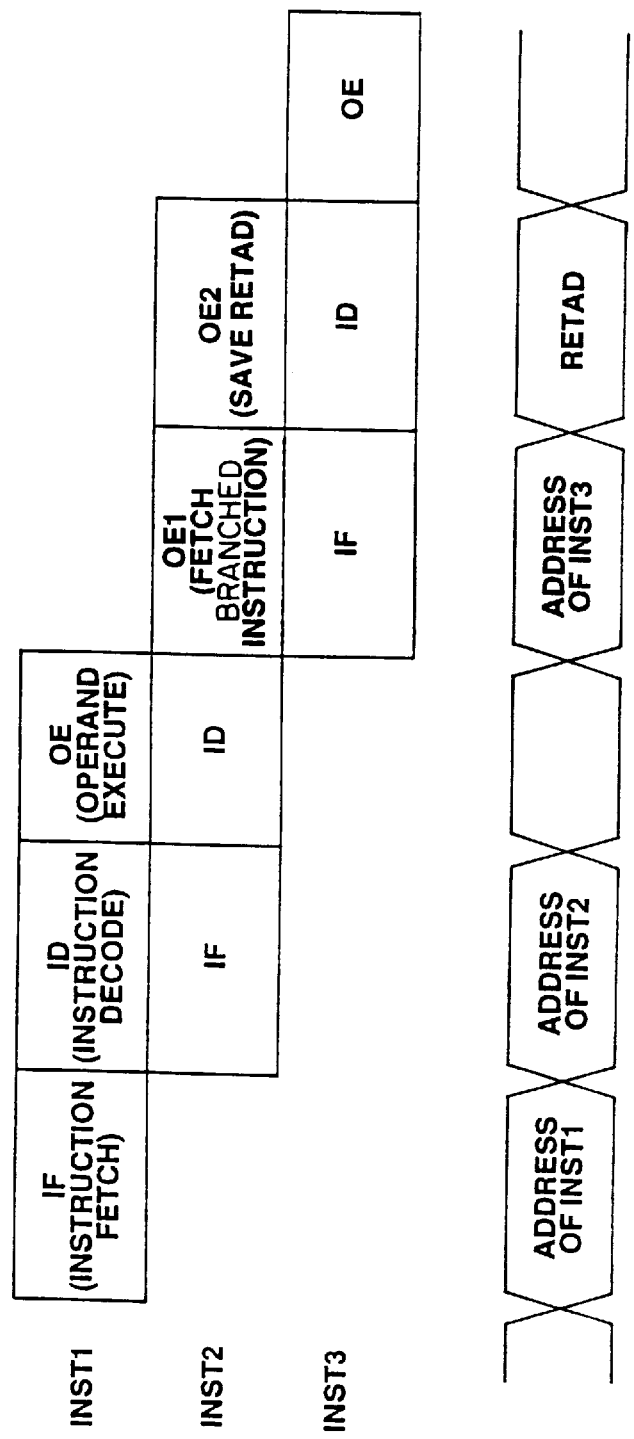
FIG. 4 is a diagram showing an instruction executing sequence of the branch instruction executing system of FIG. 3.

It is now assumed that a branch instruction of jumping to a subroutine is executed at four stages, as shown in FIG. 4. At the first step, the central processing unit 1 fetches the branched instruction. For this purpose, a branch address (BRAD) is produced from the branch address generator 6 and it is fed through a line including the path a, the address bus 5 and the path f to read a branched instruction from the computer memory 3. The branched instruction is fed from the computer memory 3 through the path e to the data bus 4 and, in turn, through the path g to the instruction register 2.

At the second step, the central processing unit 1 temporarily saves the content of the program counter 7A into the register 7B by shifting the return address (RETAD) from the program counter 7A, through the path c to the register 7B.

At the third step, the central processing unit 1 updates the content of the program counter 7A with a new branch address. For this purpose, the branch address (BRAD) produced in the branch address generator 6 is fed through the path a to the address bus 5 and, in turn, through the path b to the program counter 7A.

At the fourth step, the central processing unit saves the content (RETAD) of the register 7B into the computer memory 3. For this purpose, the return address (RETAD), which is saved temporarily in the register 7B, is shifted from the register 7B through the path d to the data bus 4 and, in turn, through the path e to the computer memory 3. In this case, the stack address stored in the stack pointer 9 is fed through the path h to the address bus 5 and, in turn, through the path f to the computer memory 3.

The simultaneous execution of the first and second steps causes no problem. Since program counter 7A and register 7B operate as a flip flop, the third step can be executed at the same time as the first and second steps. Consequently, it is possible to execute the first, second and third steps at the same time. The fourth step is executed after the simultaneous execution of the first, second and third steps, as shown in FIG. 4. In FIG. 4, the character INST 2 indicates an branched instruction of jumping to a subroutine and the character INST 3 indicates the first instruction after the branched instruction.

According to the invention, the return address saving step is made after the branched instruction fetching step and before the branched instruction executing step. Thus, the return address can be saved simultaneously with the branched instruction decoding operation. This is effective to reduce the number of required execution cycles.

What is claimed is:

1. A method of executing a branch instruction for jumping to a subroutine in a pipeline control system having a data bus for transferring instructions and for transferring data, said method comprising the steps of:

concurrently performing the operations of:
   (a) fetching a subroutine instruction from a memory means using said data bus,
   (b) temporarily saving in a temporary storage means a return address to which control is returned after the subroutine is executed, and
   (c) storing a branch address indicating the location of the subroutine instruction in a storage means;

reading the return address from said temporary storage means and saving the return address in said memory means; and executing the subroutine instruction.

2. The method as claimed in claim 1, wherein said storage means is a program counter.

3. The method as claimed in claim 2, wherein the step of temporarily saving the return address includes transferring via a data line the return address from said program counter to said temporary storage means for temporarily storing the return address in said temporary storage means prior to said subsequent step of saving the return address in said memory means.

4. The method as claimed in claim 1, wherein the branch address is generated by a branch address generator and transferred to said memory means to enable said fetching of the subroutine instruction from said memory means.

5. The method as claimed in claim 1, further comprising the step of decoding said subroutine instruction concurrently with said step of saving of the return address in said memory means.

6. Apparatus for executing a branch instruction for jumping to a subroutine in a pipeline control system, comprising:

a data bus for transferring instructions and for transferring data;

a temporary store;

means for fetching a subroutine instruction from a memory means using said data bus;

means for temporarily saving in a temporary store a return address to which control is returned after the subroutine is executed;

means for storing a branch address indicating the location of said subroutine instruction;

means for subsequently reading the return address from said temporary store and saving the return address in a memory means; and means for executing the subroutine instruction;

wherein the fetching of said subroutine instruction, the saving of said return address, and the storing of said branch address are substantially simultaneous.

7. The apparatus of claim 6, wherein said means for storing a branch address comprises a program counter.

8. The apparatus of claim 6, further comprising a branch address generator for generating the branch address and further comprising means for transferring the branch address from said branch address generator to said memory means to enable said fetching of the subroutine instruction from said memory means.

* * * * *